(12) United States Patent
Akkapeddi

(10) Patent No.: US 11,973,833 B2
(45) Date of Patent: Apr. 30, 2024

(54) SYSTEM AND METHOD FOR AUTO-SEGMENTATION OF DIGITAL RESOURCES FOR FACILITATING RESOURCE PROCESSING EVENTS IN A VIRTUAL ECOSYSTEM

(71) Applicant: BANK OF AMERICA CORPORATION, Charlotte, NC (US)

(72) Inventor: Naga Vamsi Krishna Akkapeddi, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 151 days.

(21) Appl. No.: 17/882,044

(22) Filed: Aug. 5, 2022

(65) Prior Publication Data
US 2024/0048623 A1 Feb. 8, 2024

(51) Int. Cl.
*G06F 15/16* (2006.01)
*G06Q 20/40* (2012.01)
*H04L 67/133* (2022.01)

(52) U.S. Cl.
CPC ......... *H04L 67/133* (2022.05); *G06Q 20/401* (2013.01)

(58) Field of Classification Search
CPC .............................. H04L 67/133; G06Q 20/401
USPC ........................................................ 709/203
See application file for complete search history.

(56) References Cited

U.S. PATENT DOCUMENTS

| 8,332,281 | B2 | 12/2012 | Smith et al. |
| 10,936,580 | B2 | 3/2021 | Shi et al. |
| 11,075,891 | B1 | 7/2021 | Long et al. |
| 11,367,060 | B1 | 6/2022 | Barbashin et al. |
| 11,461,774 | B1 | 10/2022 | Khan |
| 11,481,815 | B1 | 10/2022 | Aviv et al. |
| 11,520,806 | B1 | 12/2022 | Shih et al. |
| 11,775,945 | B2* | 10/2023 | Haldenby ............ G06Q 20/401 705/51 |
| 2019/0066000 | A1 | 2/2019 | Veloz et al. |
| 2021/0287195 | A1 | 9/2021 | Prakash et al. |
| 2021/0304196 | A1 | 9/2021 | Patterson |
| 2021/0312462 | A1* | 10/2021 | Sun ..................... G06Q 20/105 |
| 2021/0357489 | A1 | 11/2021 | Tali et al. |
| 2022/0069996 | A1 | 3/2022 | Xue et al. |

(Continued)

FOREIGN PATENT DOCUMENTS

GB    2601894 A    6/2022

*Primary Examiner* — Muhammad Raza
*Assistant Examiner* — Karina J Garcia-Ching
(74) *Attorney, Agent, or Firm* — Moore & Van Allen PLLC; Nicholas C. Russell

(57) ABSTRACT

Embodiments of the present invention provide a system for auto-segmentation of digital resources for facilitating resource processing events in a virtual ecosystem. The system is configured for identifying that a user is initiating a resource event, receiving resource credentials associated with entity resources and digital resources from the user, automatically performing Application Programming Interface (API) calls to verify that the user can perform the resource event, receiving an input from the user to use the entity resources as a first order of resource and the digital resources as a second order of resource for the resource event, determining that entirety of the entity resources do not meet resource value associated with the resource event, and automatically initiating segmentation of the digital resources.

14 Claims, 5 Drawing Sheets

(56) References Cited

U.S. PATENT DOCUMENTS

| | | |
|---|---|---|
| 2022/0114600 A1 | 4/2022 | Blackburn et al. |
| 2022/0173893 A1 | 6/2022 | Basu et al. |
| 2022/0258059 A1 | 8/2022 | Murcin |
| 2022/0292588 A1 | 9/2022 | Collen |
| 2022/0351280 A1 | 11/2022 | Cardenas Gasca et al. |
| 2022/0392176 A1 | 12/2022 | Malik et al. |
| 2023/0078798 A1* | 3/2023 | Nguyen ............... G06Q 20/065 705/69 |
| 2023/0169417 A1* | 6/2023 | Pacella ............... G06Q 10/087 705/7.12 |

* cited by examiner

SYSTEM AND METHOD FOR AUTO-SEGMENTATION OF DIGITAL RESOURCES FOR FACILITATING RESOURCE PROCESSING EVENTS IN A VIRTUAL ECOSYSTEM

BACKGROUND

Conventional systems do not have the capability to facilitate resource processing event in the case of a lack of resources. As such, there exists a need for a system for auto-segmentation of digital resources for facilitating resource processing events in a virtual ecosystem.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for auto-segmentation of digital resources for facilitating resource processing events in a virtual ecosystem. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention identifies that a user is initiating a resource processing event, receives one or more resource credentials from the user, wherein the one or more resource credentials are associated with entity resources stored in an entity and digital resources stored on a distributed register, automatically performs one or more Application Programming Interface (API) calls to verify that the user can perform the resource processing event based on the one or more resource credentials, receives an input from the user to use the entity resources as a first order of resource and the digital resources as a second order of resource for the resource processing event, determines that entirety of the entity resources do not meet resource value associated with the resource processing event, and automatically initiates segmentation of the digital resources based on determining that the entirety of the entity resources or the digital resources do not meet the resource value associated with the resource processing event.

In some embodiments, the present invention automatically initiates the segmentation of the digital resources based on prompting the user to authorize initiation of the segmentation of the digital resources, receiving authorization from the user, transmitting the authorization and the one or more resource credentials associated with the digital resources to a digital resource provider, and receiving information associated with segmented digital resources from the digital resource provider.

In some embodiments, the present invention completes the resource processing event using the entity resources and the at least one segmented digital resource of the segmented digital resources.

In some embodiments, the present invention determines a value for number of segmentations associated with the digital resources and transmits the value for number of segmentations to the digital resource provider.

In some embodiments, the present invention automatically performs the API calls to verify that the user can perform the resource processing event based on the one or more resource credentials further comprises performing a first API call to an entity system associated with the entity to verify the entity resources; and performing a second API call to a digital resource provider to verify the digital resources.

In some embodiments, the present invention performs a third API call to a third party entity to determine value of the digital resources.

In some embodiments, the resource processing event is initiated in a virtual ecosystem.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
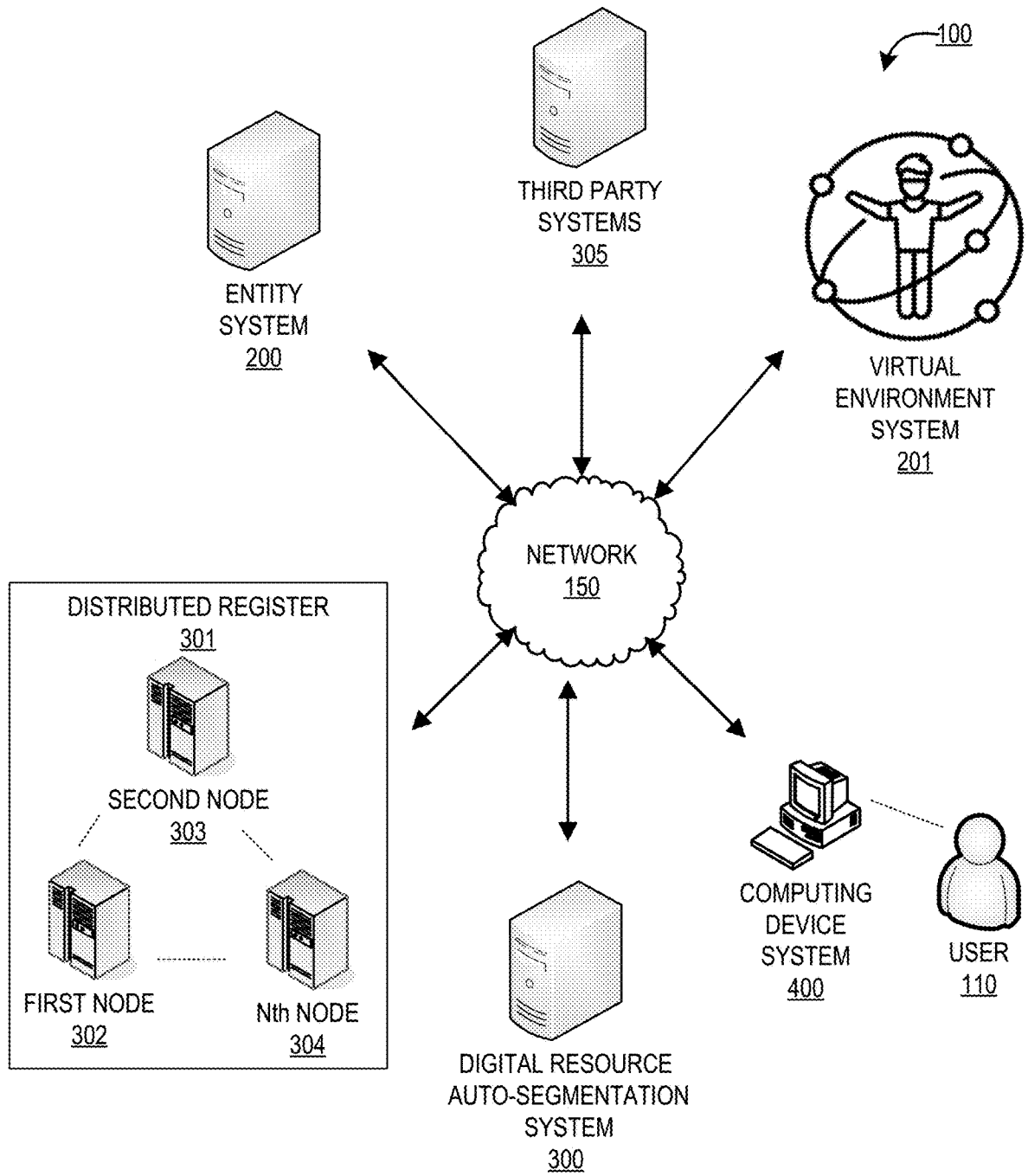
Figure 2:
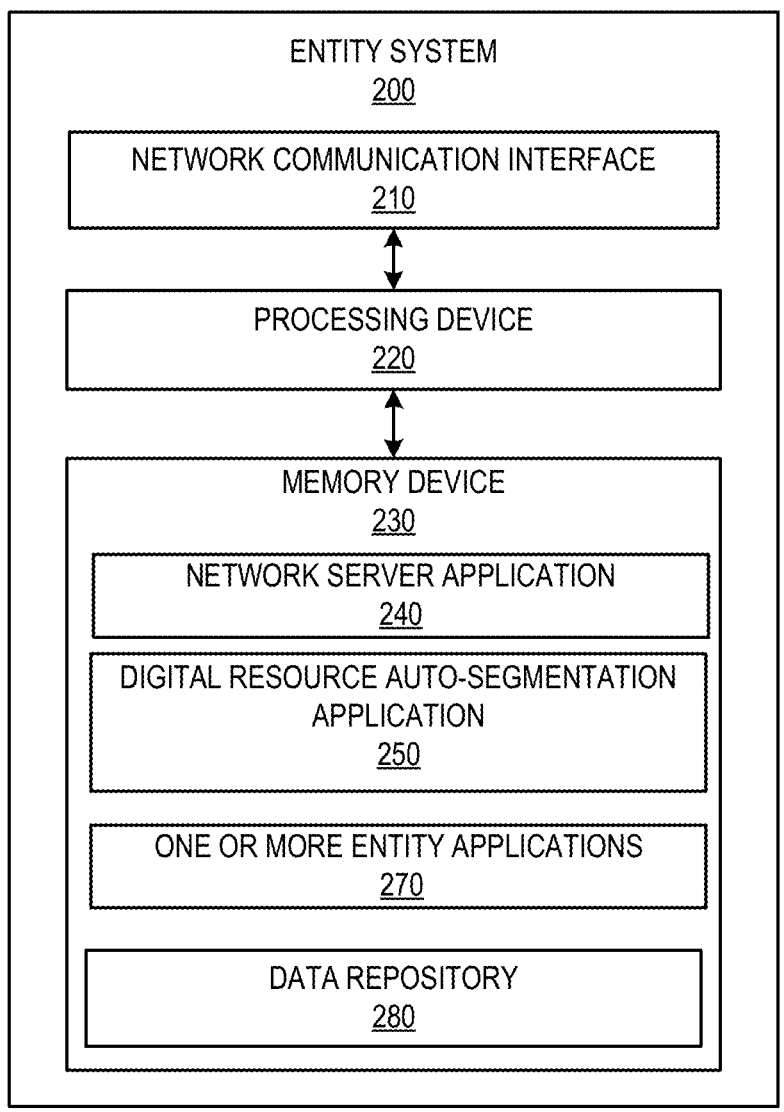
Figure 3:
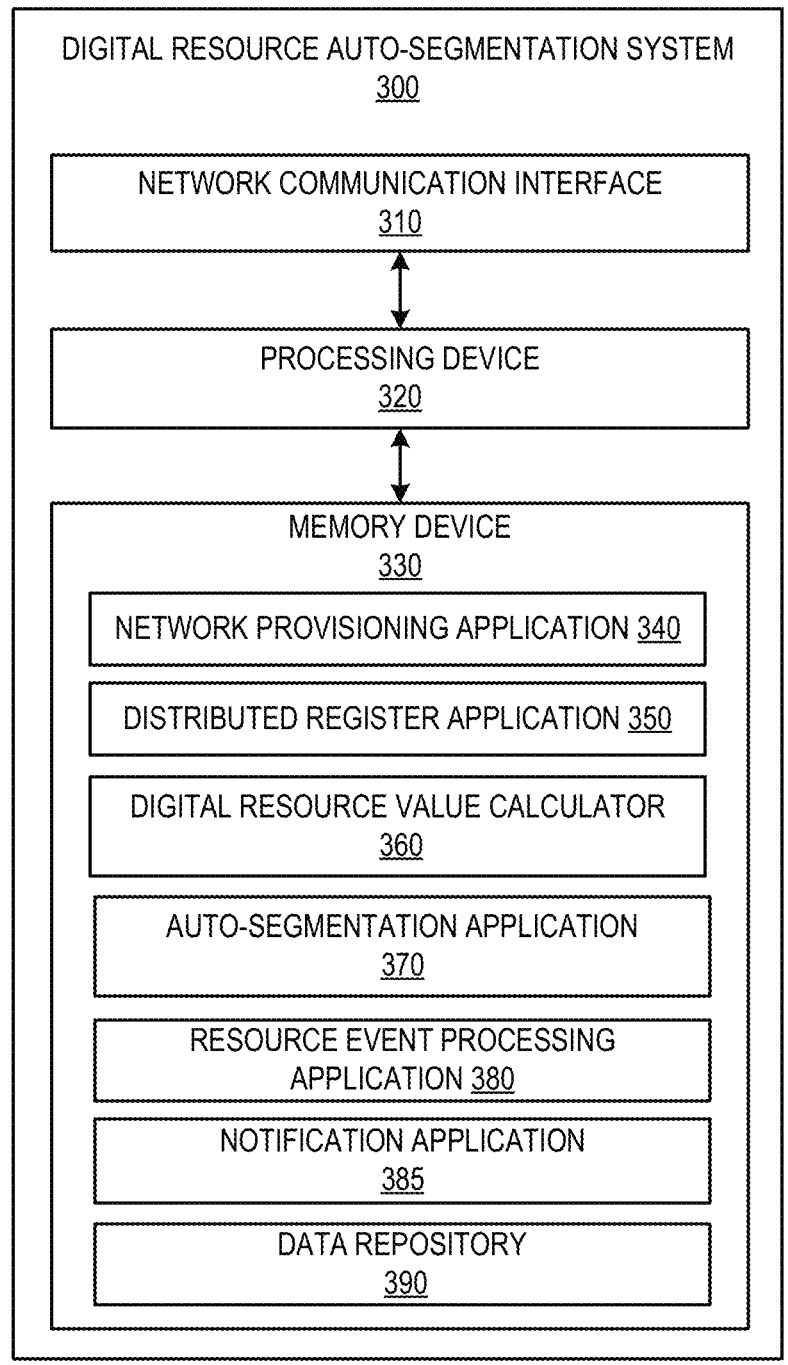
Figure 4:
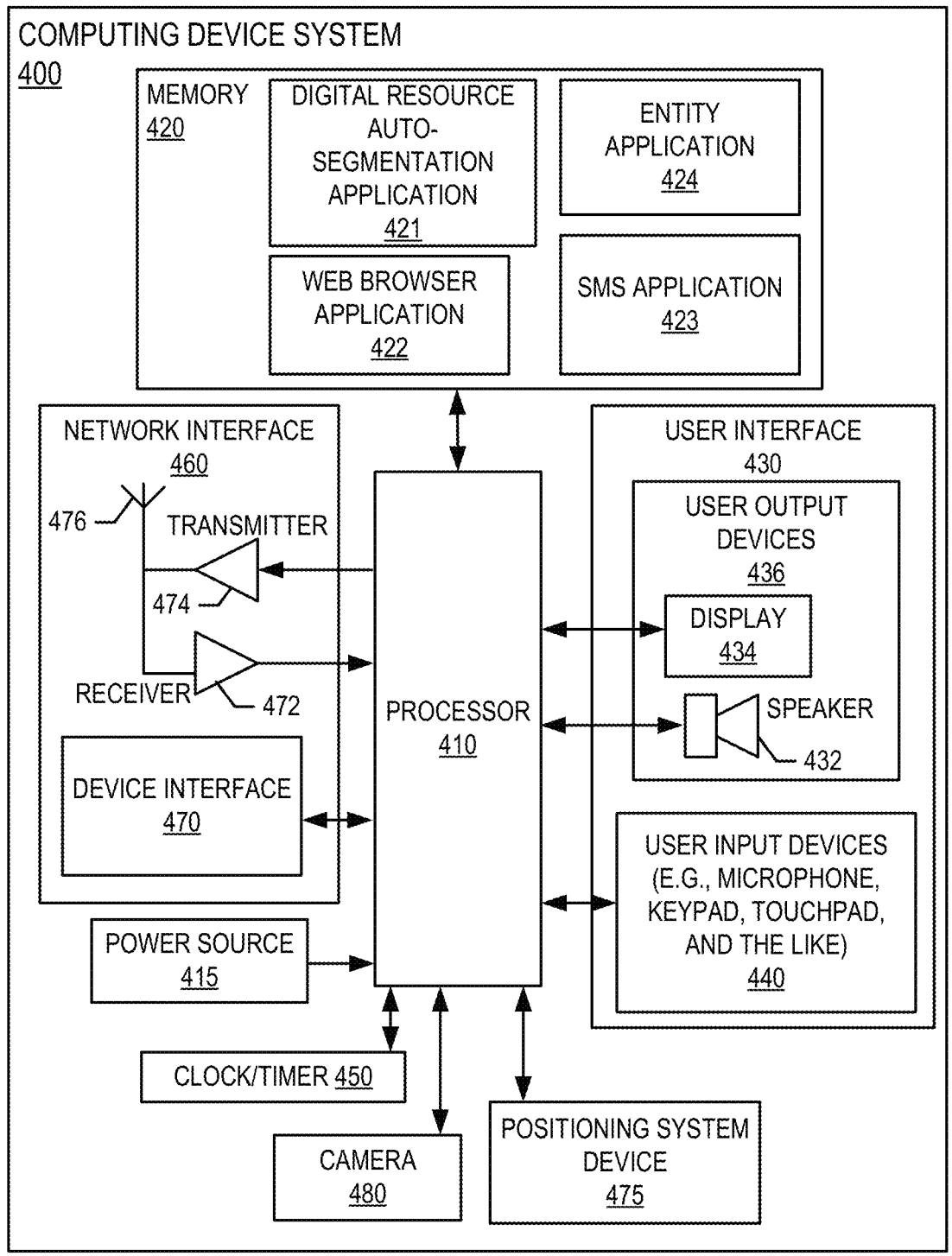
Figure 5:
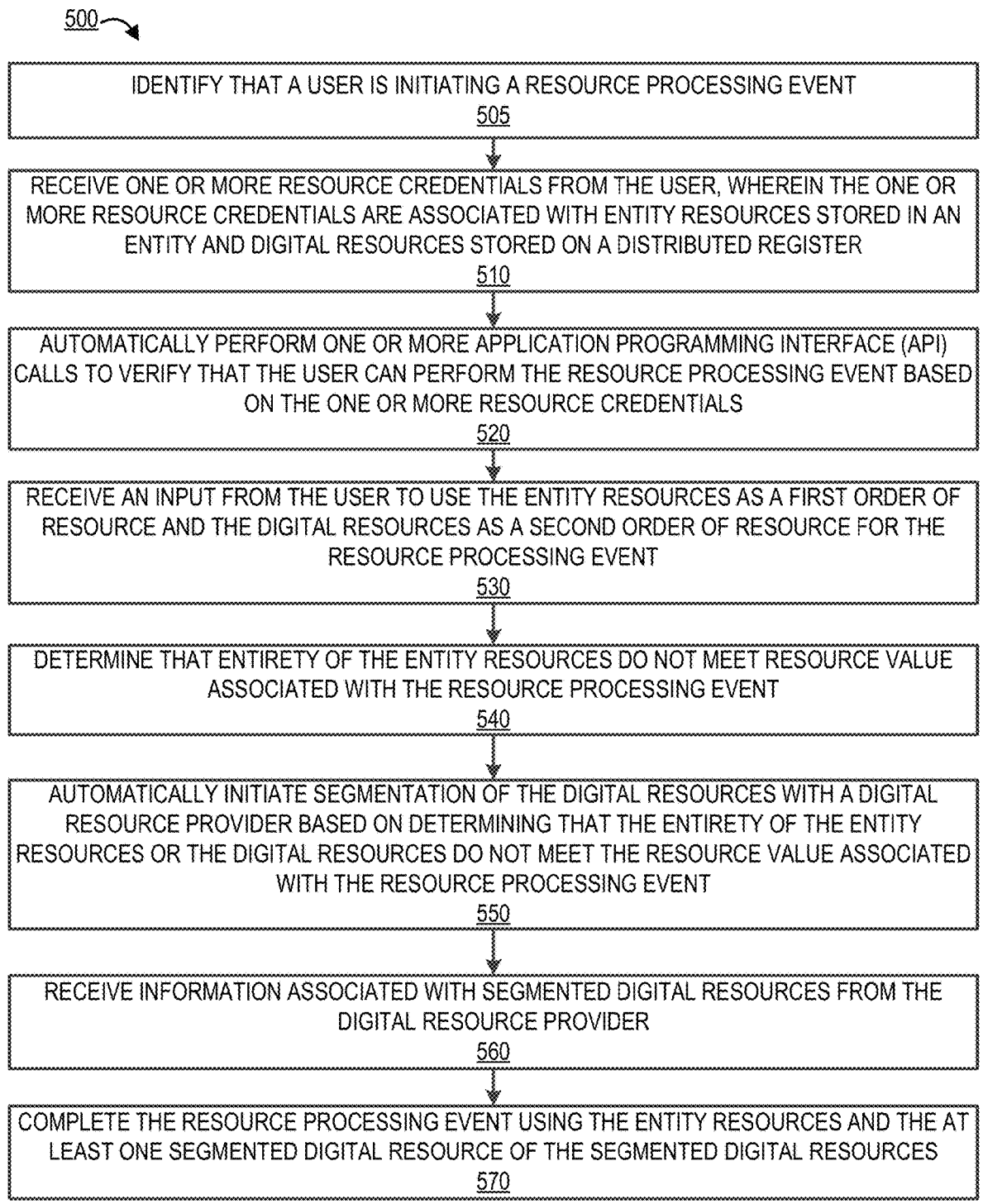

Having thus described embodiments of the invention in general terms, reference will now be made the accompanying drawings, wherein:

FIG. 1 provides a block diagram illustrating a system environment for auto-segmentation of digital resources for facilitating resource processing events in a virtual ecosystem, in accordance with an embodiment of the invention;

FIG. 2 provides a block diagram illustrating the entity system 200 of FIG. 1, in accordance with an embodiment of the invention;

FIG. 3 provides a block diagram illustrating a digital resource auto-segmentation system 300 of FIG. 1, in accordance with an embodiment of the invention;

FIG. 4 provides a block diagram illustrating the computing device system 400 of FIG. 1, in accordance with an embodiment of the invention; and FIG. 5 provides a process flow for auto-segmentation of digital resources for facilitating resource processing events in a virtual ecosystem, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, a digital ecosystem is a hypothetical iteration of the Internet as a single, universal and immersive virtual environment that is facilitated by the use of virtual reality and augmented reality devices. Thus, digital ecosystem provides the ability for a user to associate with an avatar (i.e., a virtual representation/object of the user) and for the avatar to perform one or more actions (e.g., resource exchange events, resource processing events, purchase of products, or the like) within a virtual environment. An example of such a digital ecosystem is a Metaverse.

As described herein, the term "entity" may be any entity registered on a Metaverse to conduct one or more operations. In some embodiments, the entity may be a financial institution which may include herein may include any financial institutions such as commercial banks, thrifts, federal and state savings banks, savings and loan associations, credit unions, investment companies, insurance companies and the like. In some embodiments, the entity may be a non-financial institution such as an auto dealer, retail store, department store, pharmacy, hospital, or the like.

Many of the example embodiments and implementations described herein contemplate interactions engaged in by a user with a computing device and/or one or more communication devices and/or secondary communication devices. A "user", as referenced herein, may refer to a customer of the entity. In some embodiments, the term "user" may refer to a potential customer of the entity. Furthermore, as used herein, the term "user computing device" or "mobile device" may refer to augmented reality devices, virtual reality devices, mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

"Distributed register," as used herein may also be referred to as a "distributed ledger," as used herein may refer to a structured list of data records that is decentralized and distributed amongst a plurality of computing systems and/or devices. In some embodiments, the distributed ledger may use a linked block structure.

"Linked block," "linked block structure," "linked structure," or "blockchain" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, a pointer (e.g., a hash value) to the previous block in the linked block structure, and/or any additional data created by the system of the present invention. In this way, beginning from an originating block (e.g., a "genesis block"), each block in the linked block structure is linked to another block via the pointers within the block headers. If the data or metadata within a particular block in the linked block structure becomes corrupted or modified, the hash values found in the header of the affected block and/or the downstream blocks may become mismatched, thus allowing the system to detect that the data has been corrupted or modified. In some embodiments of the present invention, a user may submit data associated with the creation of a new block associated with the linked block structure. For example, a user may initiate a transaction, where the data associated with the transaction is stored in a new block linked with the transaction.

A "linked block ledger" may refer to a distributed ledger which uses linked block data structures. Generally, a linked block ledger is an "append only" ledger in which the data within each block within the linked block ledger may not be modified after the block is added to the linked block ledger; data may only be added in a new block to the end of the linked block ledger. In this way, the linked block ledger may provide a practically immutable ledger of data records over time.

"Permissioned distributed ledger" as used herein may refer to a linked block ledger for which an access control mechanism is implemented such that only known, authorized users may take certain actions with respect to the linked block ledger (e.g., add new data records, participate in the consensus mechanism, or the like). Accordingly, "unpermissioned distributed ledger" as used herein may refer to a linked block ledger without an access control mechanism.

"Private distributed ledger" as used herein may refer to a linked block ledger accessible only to users or devices that meet specific criteria (e.g., authorized users or devices of a certain entity or other organization). Accordingly, a "public distributed ledger" is a linked block ledger accessible by any member or device in the public realm. In some embodiments of the present invention, the distributed ledger being described herein may be a permissioned distributed ledger. In some embodiments of the present invention, the distributed ledger being described herein may be a private distributed ledger.

"Node" as used herein may refer to a computing system on which the distributed ledger is hosted. In some embodiments, each node maintains a full copy of the distributed ledger. In this way, even if one or more nodes become unavailable or offline, a full copy of the distributed ledger may still be accessed via the remaining nodes in the distributed ledger system. That said, in some embodiments, the nodes may host a hybrid distributed ledger such that certain nodes may store certain segments of the linked block ledger but not others.

"Consensus," "consensus algorithm," or "consensus mechanism" as used herein may refer to the process or processes by which nodes come to an agreement with respect to the contents of the distributed ledger. Changes to the ledger (e.g., addition of data records) may require consensus to be reached by the nodes in order to become a part of the authentic version of the ledger. In this way, the consensus mechanism may ensure that each node maintains a copy of the distributed ledger that is consistent with the copies of the distributed ledger hosted on the other nodes; if the copy of the distributed ledger hosted on one node becomes corrupted or compromised, the remaining nodes may use the consensus algorithm to determine the "true" version of the distributed ledger. The nodes may use various different mechanisms or algorithms to obtain consensus, such as proof-of-work ("PoW"), proof-of-stake ("PoS"), practical byzantine fault tolerance ("PBFT"), proof-of-authority ("PoA"), or the like.

"Smart contract" as used herein may refer to executable computer code or logic that may be executed according to an agreement between parties upon the occurrence of a condition precedent (e.g., a triggering event such as the receipt of a proposed data record). In some embodiments, the smart contract may be self-executing code that is stored in the distributed ledger, where the self-executing code may be executed when the condition precedent is detected by the system on which the smart contract is stored.

In accordance with embodiments of the invention, "digital resources" may be Non-Fungible Tokens (NFTs), where NFT is a unit of data used a unique digital identifier stored on a distributed register that certifies ownership and authenticity of a digital artifact. As such, NFTs are stored in a distributed ledger—a database that is consensually shared and synchronized across multiple sites, institutions, or geographies, accessible by multiple people. Distributed ledgers use independent computers (referred to as nodes) to record, share and synchronize transactions in their respective electronic ledgers (instead of keeping data centralized as in a traditional ledger). In accordance with embodiments of the present invention, NFTs are created when a distributed ledger (e.g., blockchain) string records of cryptographic hash, a set of characters that verifies a set of data to be unique, onto previous records therefore creating a chain of identifiable data artifacts. This cryptographic transaction process ensures the authentication of each digital file by providing a digital signature that is used to track NFT ownership.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Some users who acquire digital resources (e.g., NFT) may prefer to use entity resources (e.g., cash stored in an entity by the user) and save digital resources while performing resource processing events (e.g., transaction towards purchase of a product). However, current conventional systems do not allow users to use partial digital resources when there is a shortage of the entity resources. As such, there exists a need for a system that auto-segments one or more digital resources of users for using partial digital resources in combination with entity resources to complete resource processing events. The system of the present invention solves this problem as discussed below.

FIG. 1 provides a block diagram illustrating a system environment 100 for auto-segmentation of digital resources for facilitating resource processing events in a virtual ecosystem, in accordance with an embodiment of the invention. As illustrated in FIG. 1, the environment 100 includes a digital resource auto-segmentation system 300, an entity system 200, a computing device system 400, a virtual environment system 201, one or more third party systems 305, and a distributed register 301. One or more users 110 may be included in the system environment 100, where the users 110 interact with the other entities of the system environment 100 via a user interface of the computing device system 400. In some embodiments, the one or more user(s) 110 of the system environment 100 may be customers of an entity associated with the entity system 200. In some embodiments, the one or more users 110 may be potential customers of the entity associated with the entity system 200. In some embodiments, the one or more users 110 may not be customers of the entity. In some embodiments, the one or more users 110 may be users of the virtual environment system 201.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that is part of a digital universe (also referred to as a virtual ecosystem), such as a Metaverse. One or more merchants may be a part of the digital universe, where the one or more merchants provide one or more products to the one or more users 110 in the digital universe.

The virtual environment system 201 may be one or more systems that provide access to one or more digital ecosystems associated with one or more entities (e.g., financial institutions, merchants, or the like) and also maintain and manage the one or more digital ecosystems associated with the one or more entities. In some embodiments, a part of the virtual environment system 201 may be a part of the entity system 200, where the entity system 200 provides access, manages, maintains, controls, and/or the like a digital ecosystem associated with the entity. As such, there may be multiple entity systems and/or virtual environment systems associated with the one or more entities that have digital ecosystems set up in the virtual environment.

The digital resource auto-segmentation system 300 is a system of the present invention for performing one or more process steps described herein. In some embodiments, the digital resource auto-segmentation system 300 may be an independent system. In some embodiments, the digital resource auto-segmentation system 300 may be a part of the entity system 200. In some embodiments, the digital resource auto-segmentation system 300 may be controlled, owned, managed, and/or maintained by the entity associated with the entity system 200.

In some embodiments, the distributed register 301 comprises one or more nodes (e.g., first node 302, second node 303, through nth node). In some embodiments, the distributed register 301 may be a private distributed register associated with the entity. In some embodiments, the distributed register 301 may be a public distributed register. In some embodiments, one or more of the digital resource auto-segmentation system 300, the entity system 200, and the computing device system 400 may be one or more nodes of the distributed register 301. The distributed register 301 may store the digital resources (e.g., NFT) of the one or more users 110.

In some embodiments, the third party systems 305 may be any systems that estimate the value of one or more digital resources stored in the distributed register 301. In some embodiments, the third party systems 305 may be any systems that transfer one or more attributes associated with the one or more digital resources stored in the distributed register 301 to the digital resource auto-segmentation system 300. The digital resource auto-segmentation system 300 may use the one or more attributes to calculate market value of the digital resources.

The digital resource auto-segmentation system 300, the entity system 200, the computing device system 400, the virtual environment system 201, the distributed register 301, and the third party systems 305 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the digital resource auto-segmentation system 300 is configured to communicate information or instructions with the entity system 200, the computing device system 400, the virtual environment system 201, the distributed register 301, and the third party systems 305 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the digital resource auto-segmentation system 300, entity system 200, the virtual environment system 201, the distributed register 301, and/or the third party systems 305 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution or a non-financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a digital resource auto-segmentation application 250, one or more entity applications 270, and a data repository 280 comprising historical transaction data, historical product level data associated with one or more transactions performed by the users, and the like. The one or more entity applications 270 may be any applications developed, supported, maintained, utilized, and/or controlled by the entity. The computer-executable program code of the network server application 240, the digital resource auto-segmentation application 250, the one or more entity application 270 to perform certain logic, data-extraction, and data-storing functions of the entity system 200 described herein, as well as communication functions of the entity system 200.

The network server application 240, the digital resource auto-segmentation application 250, and the one or more entity applications 270 are configured to store data in the data repository 280 or to use the data stored in the data repository 280 when communicating through the network communication interface 210 with the digital resource auto-segmentation system 300, and/or the computing device system 400 to perform one or more process steps described herein. In some embodiments, the entity system 200 may receive instructions from the digital resource auto-segmentation system 300 via the digital resource auto-segmentation application 250 to perform certain operations. The digital resource auto-segmentation application 250 may be provided by the digital resource auto-segmentation system 300. The one or more entity applications 270 may be any of the applications used, created, modified, facilitated, developed, and/or managed by the entity system 200.

FIG. 3 provides a block diagram illustrating the digital resource auto-segmentation system 300 in greater detail, in accordance with embodiments of the invention. As illustrated in FIG. 3, in one embodiment of the invention, the digital resource auto-segmentation system 300 includes one or more processing devices 320 operatively coupled to a network communication interface 310 and a memory device 330. In certain embodiments, the digital resource auto-segmentation system 300 is operated by an entity, such as a financial institution. In other embodiments, the digital resource auto-segmentation system 300 is operated by a non-financial institution. In some embodiments, the digital resource auto-segmentation system 300 is owned or operated by the entity of the entity system 200. In some embodiments, the digital resource auto-segmentation system 300 may be an independent system. In alternate embodiments, the digital resource auto-segmentation system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the digital resource auto-segmentation system 300 described herein. For example, in one embodiment of the digital resource auto-segmentation system 300, the memory device 330 includes, but is not limited to, a network provisioning application 340, a distributed register application 350, a digital resource value calculator 360, an auto-segmentation application 370, a resource event processing application 380, a notification application 385, and a data repository 390 comprising any data processed or accessed by one or more applications in the memory device 330. The computer-executable program code of the network provisioning application 340, the distributed register application 350, the digital resource value calculator 360, the auto-segmentation application 370, the resource event processing application 380, and the notification application 385 may instruct the processing device 320 to perform certain logic, data-processing, and data-storing functions of the digital resource auto-segmentation system 300 described herein, as well as communication functions of the digital resource auto-segmentation system 300.

The network provisioning application 340, the distributed register application 350, the digital resource value calculator 360, the auto-segmentation application 370, the resource event processing application 380, and the notification application 385 are configured to invoke or use the data in the data repository 390 when communicating through the network communication interface 310 with the entity system 200, and/or the computing device system 400. In some embodiments, the network provisioning application 340, the distributed register application 350, the digital resource value calculator 360, the auto-segmentation application 370, the resource event processing application 380, and the notification application 385 may store the data extracted or received from the entity system 200, and the computing device system 400 in the data repository 390. In some embodiments, the network provisioning application 340, the distributed register application 350, the digital resource value calculator 360, the auto-segmentation application 370, the resource event processing application 380, and the notification application 385 may be a part of a single application (e.g., modules).

The distributed register application 350 may allow the system 300 to communicate with the distributed register 301 and a digital resource provider managing one or more digital resources stored on the distributed register 301. The digital resource value calculator 360 may estimate value of the digital resources by communicating with one or more third party systems 305. The auto-segmentation application 370 initiates the process of auto-segmentation of the digital resources. The resource event processing application 380 processed and completes the resource processing events using at least in part on the digital resources and the entity resources. The notification application 385 may generate and transmit one or more notifications associated with the process flow described in FIG. 5.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a digital resource auto-segmentation application 421, entity application 424. These applications also typically instructions to a graphical user interface (GUI) on the display 430 that allows the user 110 to interact with the entity system 200, the digital resource auto-segmentation system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the digital resource auto-segmentation application 421 provided by the digital resource auto-segmentation system 300 allows the user 110 to access the digital resource auto-segmentation system 300. In some embodiments, the entity application 424 provided by the entity system 200 and the digital resource auto-segmentation application 421 allow the user 110 to access the functionalities provided by the digital resource auto-segmentation system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a flowchart 500 illustrating a process flow for auto-segmentation of digital resources for facilitating resource processing events in a virtual ecosystem, in accordance with an embodiment of the invention. As shown in block 505, the system identifies that a user is initiating a resource processing event. The resource processing event may be any event that includes exchange of resources (e.g., funds) between the user and a merchant for purchase of goods, services, products, and/or the like provided by the merchant. In some embodiments, the resource processing events may be events initiated in a virtual ecosystem, such as a Metaverse. For example, the user may use the computing device system 400 to initiate a transaction towards purchase of product at a merchant 'A' in the virtual ecosystem. In some embodiments, the system may receive the indication of initiation of the resource processing event from the merchant. In some embodiments, the system may monitor and track user activity via the computing device system 400.

As shown in block 510, the system receives one or more resource credentials from the user, wherein the one or more resource credentials are associated with entity resources stored in an entity and digital resources stored on a distributed register. The entity resources may be resources (e.g., cash) stored by the user in the entity (e.g., financial institution). The digital resources may be digitally stored on the distributed register (e.g., distributed register 301).

As shown in block 520, the system automatically performs one or more Application Programming Interface (API) calls to verify that the user can perform the resource processing event based on the one or more resource credentials. Performing the one or more API calls may comprise (i) performing a first API call to an entity system (e.g., entity system 200) associated with the entity to verify the entity resources, (ii) performing a second API call to a digital resource provider to verify the digital resources, where the digital resource provider is a provider that issues, maintains, manages, and/or the like one or more digital resources and stores them on the distributed register (e.g., distributed register 301), and (iii) performing a third API call to a third party entity to determine value of the digital resources, where the third party entity (e.g., third party system 305 provides information required to estimate value of the digital resources). The system may automatically initiate the one or more API calls after receiving the one or more resource credentials from the user. The one or more resource credentials allow the system of the invention to access details about the entity resources and the digital resources. For example, in response to receiving the one or more resource credentials from the user, the system may perform the one or more API calls to access one or more accounts associated with the entity resources and the digital resources using the one or more resource credentials to collect data associated with the entity resources (e.g., current balance of cash in a checking account, savings account, or the like) and the digital resources (e.g., ownership information of NFT, value of the NFT, or the like). After performing the one or more API calls, the system verifies that the value of the digital resources and the entity resources meet resource value associated with the resource processing event. For example, the system may verify that the digital resources and the entity resources combined may be used to fulfill the transaction initiated by the user.

As shown in block 530, the system receives an input from the user to use the entity resources as a first order of resource and the digital resources as a second order of resource for the resource processing event. For example, the user may provide the input to the system that they prefer to use entirety of the entity resources before using the digital resources.

As shown in block 540, the system determines that entirety of the entity resources do not meet resource value associated with the resource processing event. For example, the system determines that the value of the entity resources is less than the resource value associated with the resource processing event. The system may also determine that the value of the entity resources and the digital resource when combined is greater than the resource value associated with the resource processing event. In such a case, the system automatically initiates a series of steps as discussed in block 550.

As shown in block 550, the system automatically initiates segmentation of the digital resources with a digital resource provider based on determining that the entirety of the entity resources or the digital resources do not meet the resource value associated with the resource processing event. Initiating segmentation of the digital resources may comprise prompting the user to authorize initiation of the segmentation of the digital resources, receiving authorization from the user, transmitting the authorization and the one or more resource credentials associated with the digital resources to a digital resource provider, and receiving information associated with segmented digital resources from the digital resource provider. For example, the system may seek authorization from the user before initiating the segmentation of the digital resources and may transmit the authorization along with the resource credentials associated with the digital resources to an NFT provider. Upon receiving the authorization and the resource credentials, the NFT provider may perform additional authorization process to get authorization from the user, may segment the digital resources to segmented digital resources, may assign a unique token to each of the segmented digital resources, may store the segmented digital resources on the distributed register 301, and may transmit the unique token information associated with the segmented digital resources back to the system. In some embodiments, determines a value for number of segmentations associated with the digital resources and transmits the value for number of segmentations to the digital resource provider along with the authorization and the resource credentials. In some embodiments, the number of segmentations may be calculated by the system based on the market value of the digital resources, user preferences, resource value associated with the resource processing event, or the like.

As shown in block 560, the system receives information associated with segmented digital resources from the digital resource provider. As shown in block 570, the system completes the resource processing event using the entity resources and the at least one segmented digital resource of the segmented digital resources. For example, the system may sue entirety of the entity resources and two segmented digital resources to complete the resource processing event.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for auto-segmentation of digital resources for facilitating resource processing events in a virtual ecosystem, the system comprising:
   at least one network communication interface;
   at least one non-transitory storage device; and
   at least one processing device coupled to the at least one non-transitory storage device and the at least one network communication interface, wherein the at least one processing device is configured to:
   identify that a user is initiating a resource processing event;
   receive one or more resource credentials from the user, wherein the one or more resource credentials are associated with entity resources stored in an entity and digital resources stored on a distributed register;
   automatically perform one or more Application Programming Interface (API) calls to verify that the user can perform the resource processing event based on the one or more resource credentials, wherein performing one or more AIP calls further comprises:
      performing a first API call to an entity system associated with the entity to verify the entity resources;
      performing a second API call to a digital resource provider to verify the digital resources; and
      performing a third API call to a third party entity to determine value of the digital resources;
   receive an input from the user to use the entity resources as a first order of resource and the digital resources as a second order of resource for the resource processing event;
   determine that entirety of the entity resources do not meet resource value associated with the resource processing event; and
   automatically initiate segmentation of the digital resources based on determining that the entirety of the entity resources or the digital resources do not meet the resource value associated with the resource processing event.

2. The system of claim 1, wherein the at least one processing device is configured to automatically initiate the segmentation of the digital resources based on:
   prompting the user to authorize initiation of the segmentation of the digital resources;
   receiving authorization from the user;
   transmitting the authorization and the one or more resource credentials associated with the digital resources to a digital resource provider; and
   receiving information associated with segmented digital resources from the digital resource provider.

3. The system of claim 2, wherein the at least one processing device is configured to:
   complete the resource processing event using the entity resources and the at least one segmented digital resource of the segmented digital resources.

4. The system of claim 2, wherein the at least one processing device is configured to:
   determine a value for number of segmentations associated with the digital resources; and
   transmit the value for number of segmentations to the digital resource provider.

5. The system of claim 1, wherein the resource processing event is initiated in a virtual ecosystem.

6. A computer program product f or auto-segmentation of digital resources for facilitating resource processing events in a virtual ecosystem, the computer program product comprising a non-transitory computer-readable storage medium having computer executable instructions for causing a computer processor to perform the steps of:
   identifying that a user is initiating a resource processing event;
   receiving one or more resource credentials from the user, wherein the one or more resource credentials are associated with entity resources stored in an entity and digital resources stored on a distributed register;
   automatically performing one or more Application Programming Interface (API) calls to verify that the user can perform the resource processing event based on the one or more resource credentials, wherein performing one or more AIP calls further comprises:
      performing a first API call to an entity system associated with the entity to verify the entity resources;
      performing a second API call to a digital resource provider to verify the digital resources; and
      performing a third API call to a third party entity to determine value of the digital resources;
   receiving an input from the user to use the entity resources as a first order of resource and the digital resources as a second order of resource for the resource processing event;
   determining that entirety of the entity resources do not meet resource value associated with the resource processing event; and
   automatically initiating segmentation of the digital resources based on determining that the entirety of the entity resources or the digital resources do not meet the resource value associated with the resource processing event.

7. The computer program product of claim 6, wherein the computer executable instructions cause the computer processor to perform the step of automatically initiating the segmentation of the digital resources based on:
   prompting the user to authorize initiation of the segmentation of the digital resources;
   receiving authorization from the user;
   transmitting the authorization and the one or more resource credentials associated with the digital resources to a digital resource provider; and
   receiving information associated with segmented digital resources from the digital resource provider.

8. The computer program product of claim 7, wherein the computer executable instructions cause the computer processor to perform the step of completing the resource processing event using the entity resources and the at least one segmented digital resource of the segmented digital resources.

9. The computer program product of claim 7, wherein the computer executable instructions cause the computer processor to perform the steps of:
   determining a value for number of segmentations associated with the digital resources; and
   transmitting the value for number of segmentations to the digital resource provider.

10. The computer program product of claim 6, wherein the resource processing event is initiated in a virtual ecosystem.

11. A computer implemented method for auto-segmentation of digital resources for facilitating resource processing events in a virtual ecosystem, wherein the method comprises:
   identifying that a user is initiating a resource processing event;
   receiving one or more resource credentials from the user, wherein the one or more resource credentials are associated with entity resources stored in an entity and digital resources stored on a distributed register;
   automatically performing one or more Application Programming Interface (API) calls to verify that the user can perform the resource processing event based on the one or more resource credentials, wherein performing one or more AIP calls further comprises:
      performing a first API call to an entity system associated with the entity to verify the entity resources;
      performing a second API call to a digital resource provider to verify the digital resources; and
      performing a third API call to a third party entity to determine value of the digital resources;
   receiving an input from the user to use the entity resources as a first order of resource and the digital resources as a second order of resource for the resource processing event;
   determining that entirety of the entity resources do not meet resource value associated with the resource processing event; and
   automatically initiating segmentation of the digital resources based on determining that the entirety of the entity resources or the digital resources do not meet the resource value associated with the resource processing event.

12. The computer implemented method of claim 11, wherein automatically initiating the segmentation of the digital resources comprises:
   prompting the user to authorize initiation of the segmentation of the digital resources;
   receiving authorization from the user;
   transmitting the authorization and the one or more resource credentials associated with the digital resources to a digital resource provider; and
   receiving information associated with segmented digital resources from the digital resource provider.

13. The computer implemented method of claim 12, wherein the method further comprises completing the resource processing event using the entity resources and the at least one segmented digital resource of the segmented digital resources.

14. The computer implemented method of claim 12, wherein the method further comprises:
   determining a value for number of segmentations associated with the digital resources; and
   transmitting the value for number of segmentations to the digital resource provider.

* * * * *